United States Patent [19]

Hagenbuch

[11] Patent Number: 4,678,235
[45] Date of Patent: Jul. 7, 1987

[54] APPARATUS FOR ROTATION OF TAILGATE ASSEMBLY

[76] Inventor: LeRoy G. Hagenbuch, 4602 N. Rosemead, Peoria, Ill. 61604

[21] Appl. No.: 759,401

[22] Filed: Jul. 25, 1983

[51] Int. Cl.⁴ .............................................. B60P 1/26
[52] U.S. Cl. .................................. 298/23 DF; 296/56; 296/184
[58] Field of Search ............ 105/261 A; 296/56, 184; 298/6, 7, 8 R, 8 T, 23 D, 23 DF, 23 C, 23 R; 414/519, 520, 521

[56] References Cited

U.S. PATENT DOCUMENTS

| 1,843,685 | 2/1932 | Kissinger | 298/23 DF |
| 3,751,112 | 8/1973 | Hagenbuch | 298/23 DF |
| 3,917,343 | 11/1975 | Taylor et al. | 298/23 DF |
| 4,323,279 | 4/1982 | Domes et al. | 298/23 DF |
| 4,621,858 | 11/1986 | Hagenbuch | 298/23 DF |

FOREIGN PATENT DOCUMENTS

| 610605 | 9/1926 | France | 298/23 |
| 1035700 | 8/1953 | France | 298/23 R |

Primary Examiner—L. J. Paperner
Assistant Examiner—Janice Krizek
Attorney, Agent, or Firm—Leydig, Voit & Mayer

[57] ABSTRACT

In a tailgate assembly, a connecting mechanism which joins one end of each side plate of the assembly to the frame of the vehicle carrying the assembly wherein pivoting of the dump body of the vehicle causes the connecting mechanism to rotate the tailgate assembly. The connecting mechanism includes a chain on each side of the body which is biased about the side of the body by a roller assembly that engages the chain to hold it away from the side and to limit its lateral movement along the length of the side.

8 Claims, 6 Drawing Figures

APPARATUS FOR ROTATION OF TAILGATE ASSEMBLY

TECHNICAL FIELD

The invention generally relates to tailgate assemblies for off-road, heavy-duty trucks and more particularly relates to mechanisms for raising and lowering tailgates.

BACKGROUND

Because tailgate assemblies can be damaged by the difficult tasks performed by the off-road, heavy-duty trucks, the bodies of the trucks have traditionally been designed to function without tailgates. But, as a result of a desire to increase capacity, tailgate assemblies have been designed for addition of tailgates to the bodies which are capable of withstanding the harsh working environment of off-road trucks. For example, in U.S. Pat. No. 3,751,112 to Hagenbuch a tailgate assembly includes two side plates that are pivotally connected to the sides of the body. In order to raise the tailgate upon the pivoting of the body, a pair of outriggers mounted to the frame of the truck, secure one end of a pair of chains (or cables) which cause the tailgate to rotate when the body is dumped.

By providing outriggers, the chains or cables which rotate the tailgate are attached at a point on the frame which extends out beyond the side of the body. By attaching one end of the chains at the end of the outriggers, the chains are not biased around the bottom edge of the body, which would cause damage to both the chains and the truck body.

But, because the outriggers are a cantilever and extend from the frame to a point beyond the sides of the body, the outriggers may be plagued with problems under certain conditions. For instance, because of limited available space on the frames of some truck models, the area of the base of the outriggers (where they attach to the frame) may be smaller than desired. The strength of the outriggers may be compromised if the bases of the outriggers have areas too small for the outriggers to withstand the large forces exerted at the ends of the outriggers as the tailgate is rotated when the body pivots. As a result of the area of the base being too small, the outriggers may be susceptible to bending after repeated use. Finally, some manufacturers of trucks are reluctant to honor warranties if the frame of the truck has been subjected to welding as is required to mount the outriggers for the addition of a tailgate assembly.

One attempt at eliminating the potential problems of the use of outriggers to raise tailgates has been to use a shortened outrigger which does not extend beyond the sides of the body. By shortening the outrigger, the weakening caused by cantilevering is reduced. Because these outriggers do not extend beyond the sides of the body, the chains (or cables) are biased against the bottom edge of the body. When the body is pivoted to a dump position, the chains move relative to the bottom edge of the body. In order to prevent damage of the body or the chains as the body pivots in dumping, an elongated roller is mounted on each side of the body in order to protect the truck body and reduce wear of the chain.

Each roller is elongated because, as the body pivots, the chain changes position along the length of the sides of the body. As a result, in addition to the roller rotating as the chain pulls the tailgate to a raised position, the chain also walks along the length of the roller as the relative positions of the chain and roller change. Because of frictional forces, the chain does not walk smoothly along the length of the roller; instead, it moves in a jerking motion caused by the friction between the roller and chain holding it in a stationary lateral position until movement of the body and tailgate cause an angle in the chain which creates sufficient force to overcome the friction. As the body continues to pivot, the forces created by the bending chain increase until they again overcome the friction and the chain snaps to a new position. This jerking movement is extremely hard on both the rollers, the chains, the outrigger, the tailgate and the truck frame. As a result, the rollers and chains wear out quickly.

To overcome the foregoing wear problem, it is known to use a cable connection instead of a chain. Because a cable is composed of multiple strands of wire, frictional forces between strands become substantial if the elongated rollers bend the cable at too great an angle. In order to reduce the angle, the shortened outriggers are provided. Although the amount of extension of these shortened outriggers reduces problems inherent in a cantilevered support off the truck frame, the problems remain.

SUMMARY OF THE INVENTION

The primary objection of the invention is to provide a mechanism for raising and lowering a tailgate assembly which does not have the foregoing disadvantages associated with both full truck width and shortened outriggers. In this connection, it is also an object of the invention to provide a mechanism for raising and lowering tailgate assemblies that fulfills the foregoing objective without introducing new disadvantages as exemplified by the foregoing prior attempts.

It is another object of the invention to provide a tailgate assembly which can be easily added to existing truck bodies without compromising the structural integrity of the frame or body.

Other objects and advantages will become apparent with reference to the following detailed description when taken in conjunction with the drawings.

The invention provides an improved connecting mechanism joining the tailgate assembly of a dump body and the frame of the vehicle which function to rotate the tailgate assembly in response to pivoting of the dump body. In order to join the connecting mechanism to both the tailgate assembly and the frame, it is angled about the side sheets of the body. The connecting mechanism is biased away from the side sheets by a pair of roller assemblies mounted to the bottom sheet of the body of the tailgate assembly. In order to prevent repositioning of the connecting mechanism along the length of the side sheets as the body pivots and the tailgate rotates, the roller assembly includes means for limiting the lateral movement of the mechanism. The means resists lateral movement of the connecting mechanism, thereby biasing the mechanism in a plane parallel to the side plates.

While the invention will be described in some detail with reference to a preferred embodiment, it is to be understood that it is not intended to limit the invention to such detail. On the contrary, it is intended to cover all alternatives, modifications and equivalents which fall within the spirit and scope of the invention as defined by the appended claims.

DETAILED DESCRIPTION OF THE PREFERRED EMBODIMENT

Figure 1:
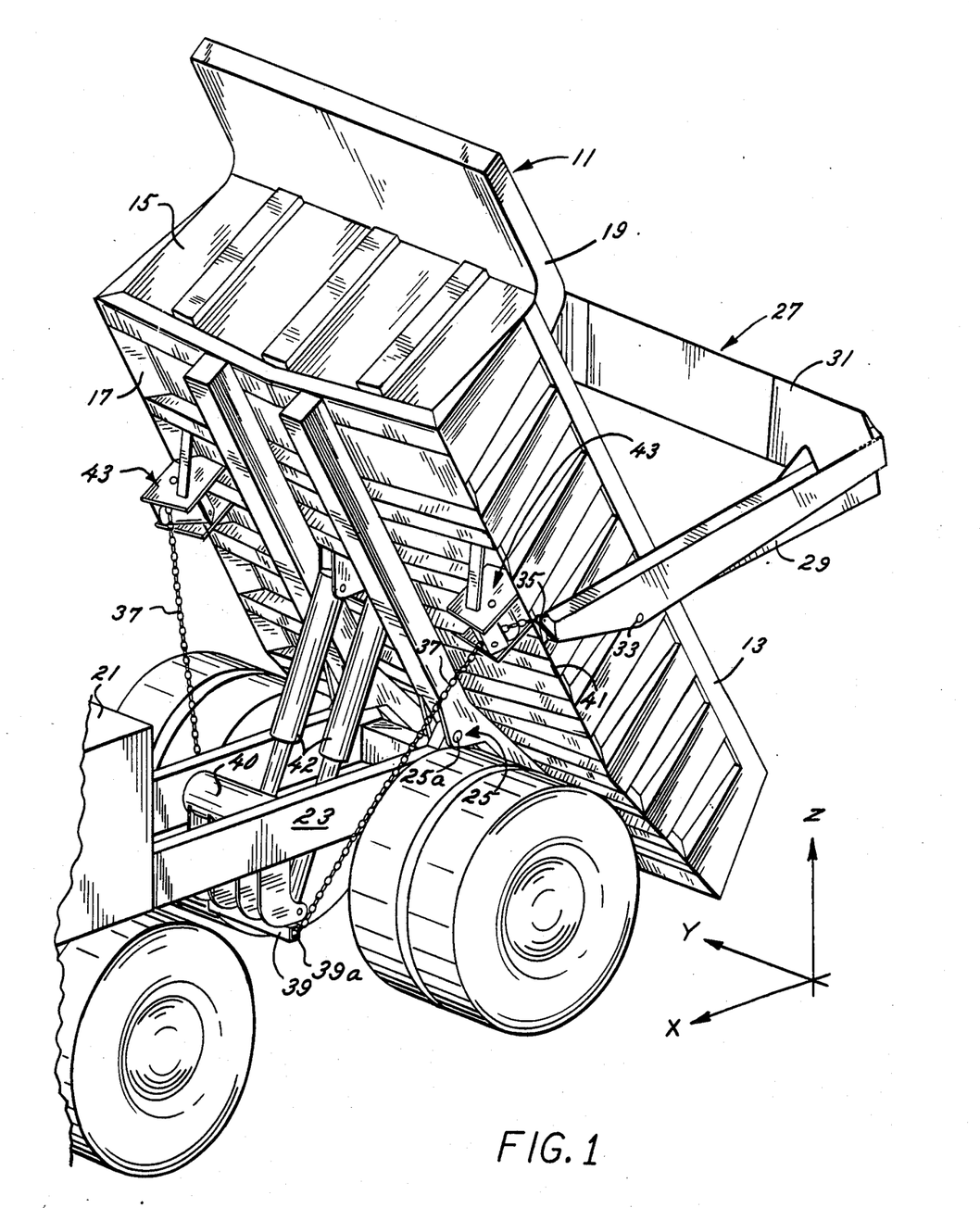
FIG. 1 is a perspective view of a heavy-duty, off-road truck with the body of the truck in its fully pivoted position in order to most clearly show the connecting mechanism for raising and lowering the tailgate assembly of the body according to the invention.

Referring first to FIG. 1, there is shown the typical rear dump vehicle illustrated in the dump position. The rear dump vehicle includes a dump body 11 having a pair of side sheets 13 (one sheet shown only), a front sheet 15 and a bottom sheet 17. Furthermore, some rear dump vehicles include a canopy 19 coupled to the dump body 11. The canopy operates to protect a cab 21 when the rear dump vehicle is being loaded. The side sheets 13, the front sheet 15 and the bottom sheet 17 provide an open top wherein earth or other loaded material can be inserted in the dump body 11. The dump body 11 is generally connected to the main frame 23 by a body pivot assembly 25 so that the body can be rotated about a body pivot pin 25a for dumping the load.

Figure 2:
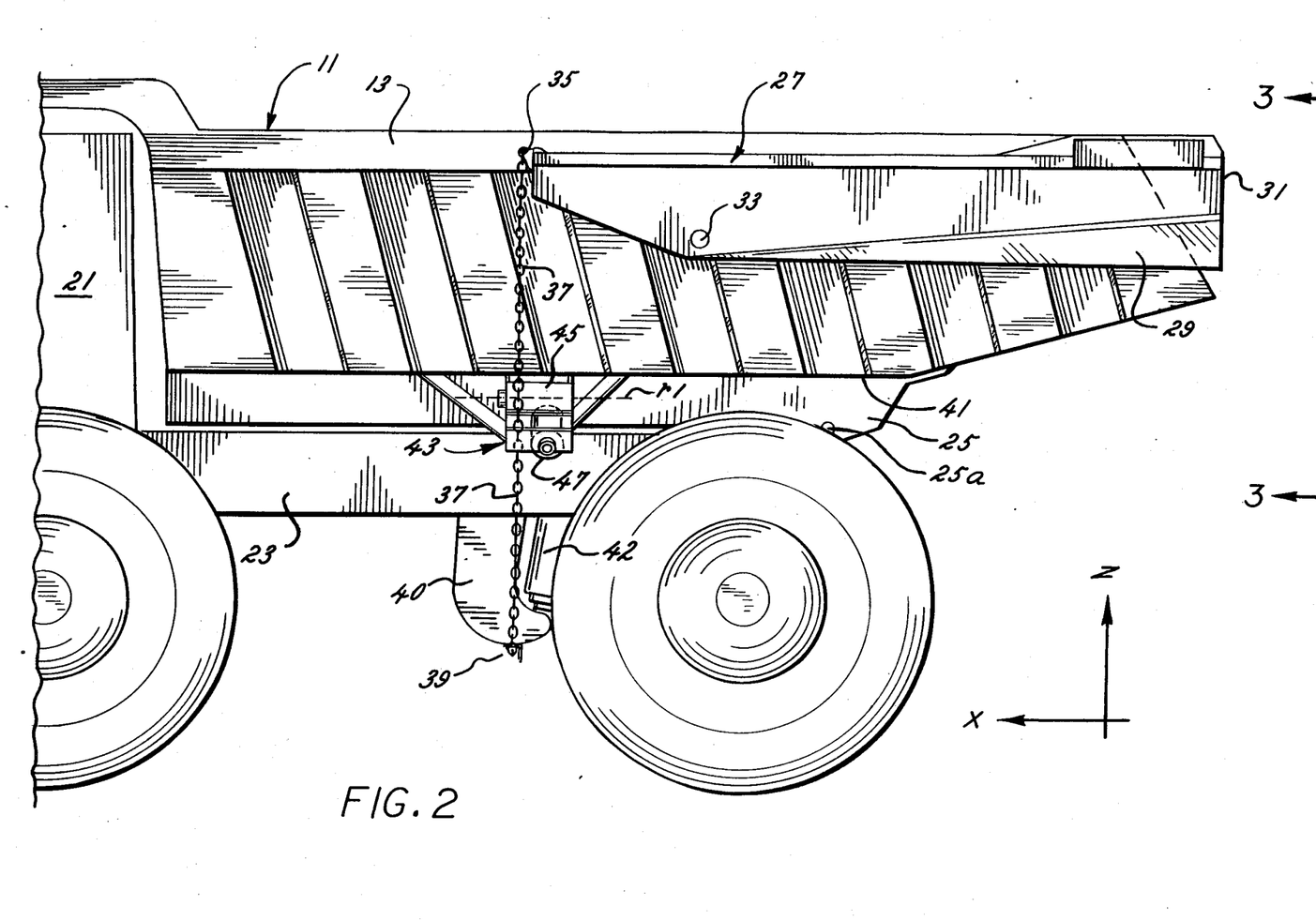
FIG. 2 is a side view of the truck showing the body in its fully lowered position in order to illustrate the position of a chain in a roller assembly of the connecting mechanism.

A tailgate assembly 27 is illustrated having a pair of side plates 29 (one of which is illustrated only) and a rear plate 31. The side plates 29 are pivotally connected to the side sheets 13 of the dump body 11 by a tailgate pivot pin 33. Consequently, the tailgate 27 can pivot about the pivot pin 33 to provide both a dump position (as shown in FIG. 1) and a load position (as shown in FIG. 2). The rear plate 31 of the tailgate 27 is illustrated in FIG. 2 as extending beyond the rear portions of the side sheets 13. Furthermore, the rear plate 31 is shown substantially perpendicular to a ground surface. Consequently, the rear plate 31 when in the load position provides an increased volume for the dump body 11 in which loaded material can be placed.

The forward edge of the side plates 29 of the tailgate assembly 27 have extension pieces 35 thereon which provide an anchor for a chain 37. At the opposite end of the chain 37, it is connected to an elongated mounting support 39. The mounting support 39 is in turn welded to a base section 40 for the hoist cylinders 42. As an aid in describing relative movement of the dump body 11, the tailgate assembly 27 and the chain 37, a Cartesian coordinate system is illustrated with a Y-axis aligned parallel with the axis of rotation for the dump body and the X-axis parallel with the length of the vehicle. The Z-axis is substantially vertical.

As the forward portion of the dump body 11 is raised by the hoist cylinders 42, the dump body is pivoted about the body pivot pin 25a. Pivoting of the dump body 11 causes the chain 37 to become taut and, as a result, exerts a torque on the side plate 29 which causes counterclockwise rotation of the tailgate assembly 27 about the pivot pin 33. As illustrated in FIG. 1, pivoting of the dump body 11 causes the rear plate 31 to rotate to a position which substantially clears the normal maximum load height of loaded material carried in the dump body. Consequently, any material on the bottom sheet 17 of the dump body 11 can be discharged beneath the rear plate 31 of the tailgate assembly 27 and through the rear portion of the side sheets 13.

The tailgate pivot pin 33 can be located at any desired position relative to the side plate 29 of the tailgate assembly 27 and the side sheets 13 of the dump body 11. However, a desired position for the tailgate pivot pin 33 is in a position which causes a slight raising of the rear plate 31 of the tailgate assembly 27 to an angle approximately 90° between the top of side sheets 13 and the top of side plate 29. A slight raising of the rear plate 31 provides increased clearance between the rear plate and the bottom sheet 17 for discharge of the loaded material. By placing the pivot pin 33 substantially forward from the rear of the side sheets 13 (as shown in FIG. 1), rotating motion of the surface of the rear plate 31 is upwardly and over the loaded material.

The mounting support 39 is preferably an elongated, square and hollow tubing (e.g., steel) which is secured to the lowermost portion of the base section 40 which anchors one end of each of the hoist cylinders 42. Although the mounting support 39 eliminates the need for outriggers, the chain 37 can no longer maintain a straight line in the Y-Z plane, as it could when an outrigger was present.

Figure 3:
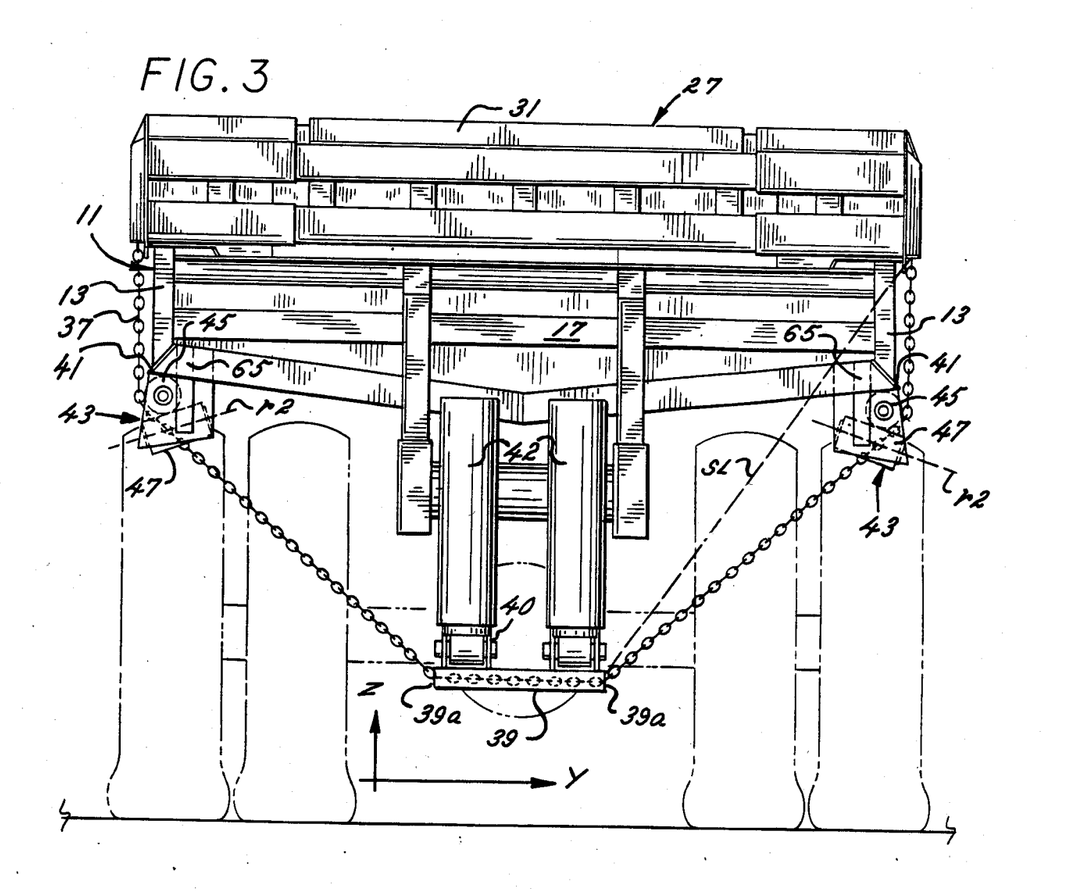
FIG. 3 is a rear view of the truck showing the body in its fully lowered position, taken along the line 3—3 in FIG. 2.

As best seen in FIG. 3, a straight line SL in the Y-Z plane connecting the extension piece 35 to the end 39a of the mounting support 39 cuts through the side walls 13 and the bottom 17. Therefore, the chain 37 must be biased around the edge 41 formed where the side 13 meets the bottom 17. In order to direct the chains 37 around their respective edges 41, a pair of roller assemblies 43 are mounted (e.g., welded) on the bottom sheet 17 and adjacent the edges 41 in order to engage the chains 37 and prevent scraping of the edges against the chains as they move relative to one another as the dump body 11 pivots.

Referring more particularly to FIGS. 2 and 3, in the lowered position of the dump body 11, each of the chains 37 describe a straight line in the X-Z plane and an angled line in the Y-Z plane. The angling of the chain 37 in the Y-Z plane is provided by a cylindrical roller 45 in each of the roller assemblies 43 which causes the chain to be biased away from the edge 41. Because the roller 45 is mounted for rotation about an axis $r_1$ which is substantially transverse to the line formed by the chain 37 in the X-Z plane, pivoting of the dump body 11 will cause the roller 45 to rotate as the chain moves over the surface of the roller.

In accordance with one important aspect of the invention, each of the roller assemblies include a second roller whose axis of rotation is approximately transverse to that of roller 45; when the chain is biased away from the edge 41 in the Y-Z plane by the roller 45 during pivoting of the dump body 11 and rotation of the tailgate assembly 27, the chain also is biased forwardly in the X-Z plane by the second roller so that the sliding of the chain along the length of the roller 45 is limited. Each of the second rollers is mounted in the roller assembly relative to the first roller 45 so as to engage the chain 37 as it begins to move laterally along the length of the surface of roller 45 in response to the pivoting of the dump body 11 and the rotation of the tailgate assembly 27. After the second roller engages the chain 37, further pivoting of the dump body 11 will cause the chain 37 to angle about the second roller in the X-Z plane. Because the chain 37 is biased forwardly, the first roller 45 is able to hold the chain away from the edge 41 without being of a substantially longer length. In addition, by limiting the amount of travel of the chain 37 along the length of the roller 45, the wear caused by such lateral movement is substantially reduced. Because the chain no longer catches and releases in response to the frictional dynamics of the chain moving laterally over an elongated roller as in the prior art, the raising and lowering of the tailgate assembly 27 in accordance with the invention is much smoother than previously possible in tailgate assemblies without outriggers.

Figure 4:
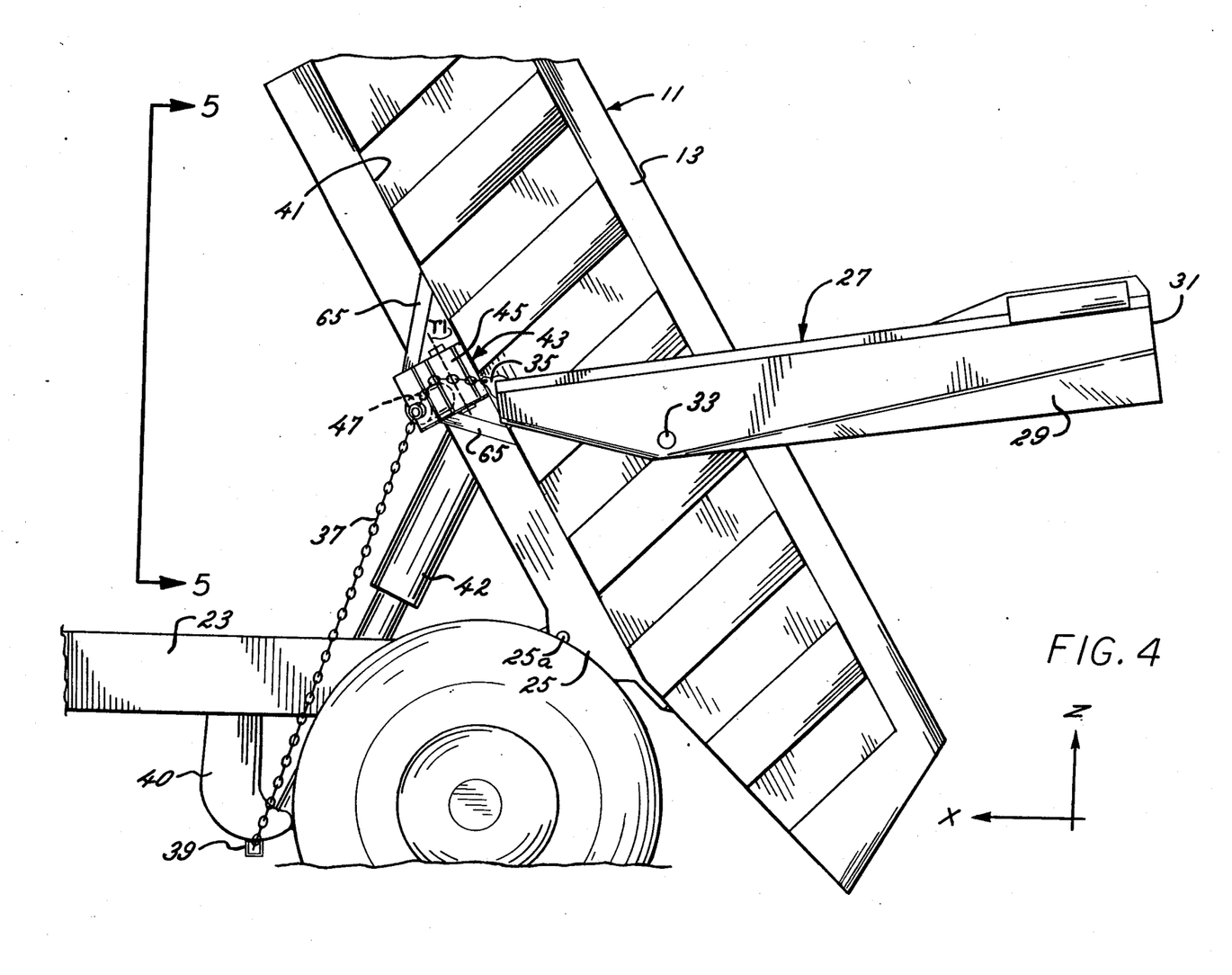
FIG. 4 is a side view of the body of the truck in a full pivoted position illustrating the position of the chain of the connecting mechanism of the invention relative to its position when the body is fully lowered as shown in FIGS. 2 and 3.

Viewing the dump body 11 from the side and in its lowered position as illustrated in FIG. 2, the chain 37 appears as aligned substantially in a straight line. Actually, the chain 37 is angled in the Y-Z plane about the edge 41 by the first roller 45, as best seen in FIG. 3, whose axis of rotation $r_1$ is in approximate parallel alignment with the edge 41. When the operator of the vehicle activates the hoist cylinders 42, the dump body 11 pivots, thereby causing the roller assembly 43 and the tailgate assembly 27 to rotate about the pivot pin 25a. As the dump body 11 pivots toward its dump position shown in FIGS. 4 and 5, the extension piece 35 moves relative to the roller assembly 43 and the mounting support 39.

Since the chain 37 remains taut as the dump body 11 pivots, it attempts to maintain a straight line between the extension piece 35 and the mounting support 39. In attempting to maintain such a straight line, the chain moves along the length of roller 45 as the relative positions of the extension piece 35 and mounting support 39 change. Because roller 47 is mounted for rotation about an axis $r_2$ that is transverse to the axis of rotation $r_1$ for roller 45, when the chain 37 reaches the surface of the roller 47 it is prevented from traveling further along the length of roller 45, and it is biased by the surface of the roller so that continued pivoting of the dump body 11 causes the chain 37 to rotate the roller as the chain becomes angled in the X-Z plane as well as the Y-Z plane.

Figure 6:
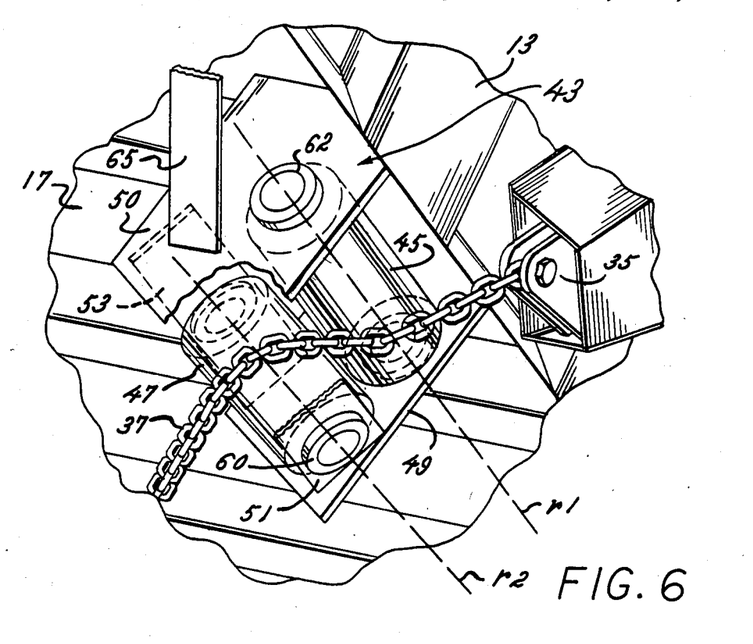
FIG. 6 is an enlarged perspective view of one of the two roller assemblies of the connecting mechanism according to the invention with a portion of the assembly cut away to more clearly illustrate the relative positions of the pair of rollers in the assembly.

Referring to FIG. 6, each of the roller assemblies 43 includes first and second metal plates 49 and 50 which are mounted on the edges to the bottom sheet 17 of the truck body 11. At the free ends of the plates 49 and 50, metal cross members 51 and 53 brace the plates so as to provide a sturdy open box structure. Spanning plates 49 and 50, the journals of roller 45 are received by holes in the plates which are surrounded by bushings 62 (only one is shown) mounted on the outside surface of each of the plates. Likewise, roller 47 spans the opposing cross members 51 and 53 with its journals being received by holes in each of the cross members which are surrounded by bushings 60 mounted on the outside surface of the members. To further support the roller assembly 43, struts 65 (only one is shown in FIG. 2) extend from the outside of the plates 49 and 50 to the surface of the bottom sheet 17.

Each of the rollers 45 and 47 is constructed of large and small tubing concentrically positioned and capped at both ends by a donut-shaped metal piece. The foregoing construction creates a central bore through each roller 45,47 that receives an elongated rod that serves as a shaft about which the rollers rotate. The ends of the shafts serve as the journals which are received by the bushings 62 and 60. As a possible addition to the roller assembly, a layer of rubber may be vulcanized to its circumference in order to further improve the smoothness of the movement of the chain 37 over the surface of the roller.

The extension piece 35, roller assembly 43 and mounting support 39 may be moved relatively to one another from their positions shown in the drawings in order to provide for varying degrees of tailgate rotation which maximizes the opening of the tailgate relative to the body. Because such repositioning may result in the chain 37 rubbing the plate 50 of the roller assembly 43, a third roller mounted in the assembly may prove necessary. By simply extending the length of the cross members 51 and 53 and the length of the roller 45, the third roller can be added which is supported by the cross members on the forward side of the chain 37. The third roller may have an axis of rotation parallel with the axis of rotation $r_2$ of the second roller 47.

Figure 5:
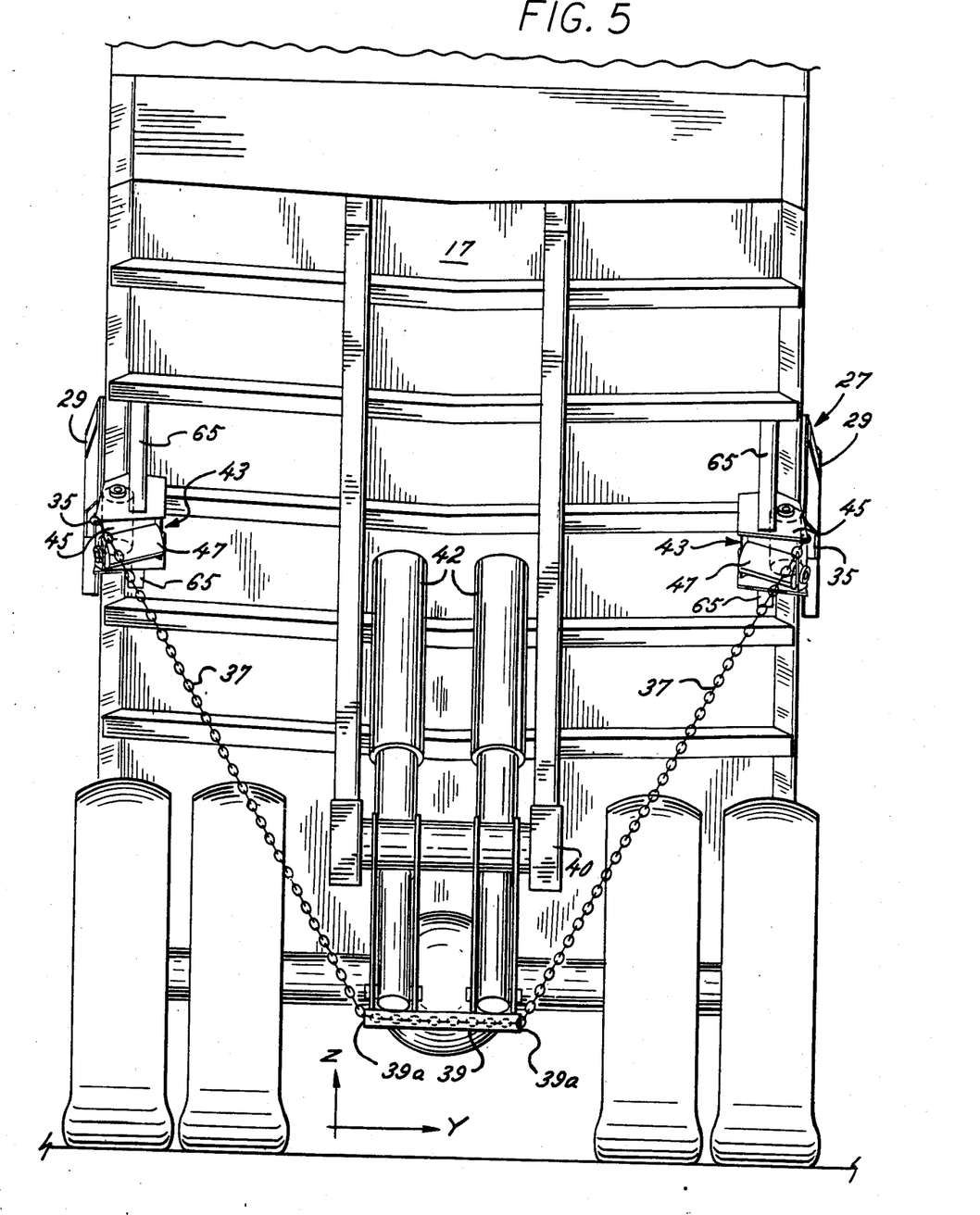
FIG. 5 is a front view of the fully pivoted body taken along the line 5—5 in FIG. 4.

In keeping with the invention, the chain 37 may be a single continuous chain which reaches from one extension piece 35 to the other as best shown in FIGS. 3 and 5. For a continuous chain 37, the mounting 39 is preferably a conduit through which the chain passes. A single continuous chain 37 responds to changes in the tension of the chain on each side of the body resulting from uneven tilting of the body. If this happens, the distance between the ends 39 of the mounting support 39 and the extension pieces 35 will increase on one side and decrease on the other side. By making the chain 37 continuous, any shifting or tilting of the body 11 is compensated for by movement of the chain through the hollow of the support mounting 39.

If the chain 37 breaks, release of the chain's tension on both sides of the body can be avoided by limiting the chain's freedom of movement through the mounting support 39. For example, a short auxiliary chain may attach the chain 39 to the mounting support such that a break on one side will permit only a limited release of the tension on the opposing side because the auxiliary chain will hold the unbroken side to the mounting support.

The preferred way of implementing the chains 37 is to provide two separate chains whose ends are secured to the ends 39a of the mounting support 39 thus tending to stabilize the tilting of the body. In order to attach the ends of each separate chain 37 to the ends 39a of the mounting support, the ends 39a are formed by welding a metal plate (not shown) over each end of the mounting support 39. Two support brackets (not shown) are positioned to be standing on end with the metal plate as their base. These support brackets receive a nut and bolt assembly that also receives the last link of the chain 39. Because the last link is sandwiched between the two support brackets, the nut and bolt assembly secures the end of the chain 37 to the mounting support 39.

From the foregoing, it will be appreciated that the connecting mechanism of the invention provides an effective means for raising and lowering a tailgate assembly for heavy-duty, off-road trucks without necessitating the use of an outrigger. Furthermore, the dual-roller assembly 43 allows the chain 37 to easily move relative to the dump body 11 without jumping and without requiring cumbersome accessory equipment in lieu of outriggers.

I claim:

1. In a rear dump vehicle of the type having a main frame and a pair of side sheets, a bottom sheet and a forward sheet that form a dump body, an improved tailgate assembly compriising:
   a pair of side plates pivotally connected to the side sheets of the dump body, each of the pair of side plates having first and second ends and a pivot point intermediate said first and second ends;
   a rear plate coupled between the second ends of each of the pair of side plates for providing a rear wall of said dump body;
   anchor means connected to the main frame of the rear dump vehicle, and being located on the main frame under the bottom sheet of the dump body so as to not extend substantially beyond the side sheets of said dump body;
   linkage means coupled between the first end of each one of said pair of side plates and said anchor means for providing rotation of said rear plate in response to counter rotation of the dump body, said linkage means spanning lower side edges of said dump body formed at the junction joining said pair of side sheets and said bottom sheet;
   a pair of roller assemblies, each mounted on the bottom sheet of said dump body adjacent the side edges for (1) biasing said linkage means away from said lower side edges, (2) preventing friction between said linkage means and said pair of side sheets during pivoting of the dump body and (3) inhibiting displacement of the linkage means along the length of said pair of side sheets;
   each of said roller assemblies comprises a first cylindrical roller mounted in said assembly for rotation about a first axis substantially parallel with said pair of side sheets, said first roller biasing said linkage means away from one of said pair of side sheets; and
   a second cylindrical roller mounted in said assembly for rotation about a second axis which is substantially transverse to said first axis, said second cylindrical roller biasing said linkage means so as to limit its lateral movement along the length of said first cylindircal roller during the pivoting of said dump body and the rotation of said tailgate assembly.

2. An improved tailgate assembly as set forth in claim 1 wherein said linkage means includes at least one chain which is angled between its connected ends by one of said roller assemblies.

3. An improved tailgage assembly as set forth in claim 2 wherein said linkage means includes a single length of chain having an attachement means at each end of the chain for connecting to one of said pair of side plates; and said anchor is a conduit which receives said chain and allows free movement of the chain through the conduit such that the tension in each portion of said single length chain spanning one of said side plates and said anchor is approximately equal.

4. A mechanism for rotating a tailgate assembly mounted for rotation on a dump body of a vehicle in response to pivoting of the body about the frame of the vehicle wherein said dump body includes a bottom sheet, two opposing side sheets and a front sheet with said side sheets meeting said bottom sheet at a junction defining side edges of said body, said mechanism comprising:
   a pair of roller assemblies, each mounted on the bottom sheet of said dump body adjacent the side edge;
   linkage means joining said tailgate assembly to said frame whereby said linkage means is biased away from said side edges by said roller assemblies in a manner so as to create angles in said linkage means that lie approximately in a first plane that is substantially transverse to a second plane which is substantially parallel with said side sheets;
   means for pivoting said dump body on said frame;
   said linkage means responding to the pivoting of said dump body to generate a torque on said tailgate assembly, thereby causing rotation of said tailgate assembly about said side sheets; and
   each of said roller assemblies including means (1) for angling said linkage means in said second plane in addition to said first plane as said body pivots and said tailgate assembly rotates so that said linkage means is biased along the length of said side edge by said means (1) to limit repositioning of the linkage means along the length of the side edge as the body pivots and the tailgate assembly rotates.

5. A mechanism as set forth in claim 4 wherein each of said roller assemblies comprises:
   a first cylindrical roller mounted in said assembly for rotation about a first axis substantially parallel with said side edge, said first roller biasing said linkage means so as to be angled in said first plane; and
   said means (1) comprising a second cylindrical roller mounted in said assembly for rotation about a second axis substantially transverse to said first axis, said second roller biasing said linkage means so as to be angled in said second plane.

6. A mechanism as set forth in claim 5 wherein said linkage means comprises at least one length of chain which moves over the surfaces of said first and second rollers as the dump body pivots and the tailgate assembly rotates.

7. In a hauling vehicle, a tailgate assembly mounted to dump body having two opposing side sheets joined to a bottom sheet to form side edges and chain means extending on each side of the vehicle joining the tailgate assmsbly and the frame of the vehicle for rotating the tailgate assembly in response to pivoting of the body, a pair of roller assemblies for angling said chain means around the side edges of said dump body, each roller assembly comprising:
   a housing for mounting to the bottom sheet of said dump body at an area adjacent said side edge;
   a first cylindrical roller mounted in said housing for rotation about a first axis such that when said housing is mounted on said bottom sheet said chain means is biased away from said side sheet by said first cylindrical roller so as to angle said chain means around said side edge in a plane substantially transverse to a plane coincident eith said side sheet;
   a second roller mounted in said housing for rotation about a second axis which is substantially transverse to said first axis such that when said housing is mounted on said bottom sheet said chain means is biased for limited movement along the length of the first roller as the dump body pivots and the tailgate assembly rotates so as to angle said chain means in a plane substantially parallel to said plane coincident with said side sheet.

8. A roller assembly as set forth in claim 7 wherein said housing includes:
   first and second opposing plates wherein a portion of whose edges are intended for mating with the bottom sheet of said dump body;
   first and second cross members joining said first and second opposing plates; and
   said first and second cylindrical rollers being mounted for rotation in said housing such that one roller spans said first and second opposing plates and the other roller spans said first and second cross members.

* * * * *

UNITED STATES PATENT AND TRADEMARK OFFICE
CERTIFICATE OF CORRECTION

PATENT NO. : 4,678,235
DATED : July 7, 1987
INVENTOR(S) : LeRoy G. Hagenbuch

It is certified that error appears in the above-identified patent and that said Letters Patent is hereby corrected as shown below:

Title page item [22] filed: "Jul. 25, 1983" should read --Jul. 25, 1985--.

Signed and Sealed this

Eighteenth Day of April, 1989

Attest:

DONALD J. QUIGG

*Attesting Officer*　　*Commissioner of Patents and Trademarks*